(12) United States Patent
Mugunda et al.

(10) Patent No.: US 11,005,726 B2
(45) Date of Patent: May 11, 2021

(54) SYSTEMS AND METHODS FOR CONFIGURING NETWORK INTERFACE AFFINITY TO SYSTEM MANAGEMENT FEATURES SUPPORTED BY A MANAGEMENT CONTROLLER

(71) Applicant: Dell Products L.P., Round Rock, TX (US)

(72) Inventors: Chandrasekhar Mugunda, Austin, TX (US); Sruthi Reddy Mothukupally, Cedar Park, TX (US); Yogesh P. Kulkarni, Round Rock, TX (US); Akkiah Choudary Maddukuri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1 day.

(21) Appl. No.: 16/036,154

(22) Filed: Jul. 16, 2018

(65) Prior Publication Data
US 2020/0021501 A1    Jan. 16, 2020

(51) Int. Cl.
*H04L 12/24* (2006.01)
*G06F 3/0482* (2013.01)

(52) U.S. Cl.
CPC ........... *H04L 41/22* (2013.01); *G06F 3/0482* (2013.01); *H04L 41/0806* (2013.01)

(58) Field of Classification Search
CPC ..... H04L 41/08; H04L 41/22; H04L 41/0806; G06F 3/0482
USPC ........................................................ 709/220
See application file for complete search history.

(56) References Cited

U.S. PATENT DOCUMENTS

| | | | | |
|---|---|---|---|---|
| 7,426,592 | B2 * | 9/2008 | Chen | G06F 9/44505 710/104 |
| 7,852,873 | B2 * | 12/2010 | Bird | H04L 41/24 370/463 |
| 2005/0027841 | A1 * | 2/2005 | Rolfe | H04L 41/0226 709/223 |
| 2012/0084408 | A1 * | 4/2012 | Ayanam | H04L 41/0803 709/220 |
| 2014/0006676 | A1 * | 1/2014 | Chandrasekhar | G06F 13/4022 710/316 |
| 2014/0029039 | A1 * | 1/2014 | Deter | G06F 21/604 358/1.14 |
| 2014/0090051 | A1 * | 3/2014 | Brundridge | G06F 21/105 726/17 |
| 2014/0101562 | A1 * | 4/2014 | Yao | H04L 67/06 715/738 |
| 2014/0289570 | A1 * | 9/2014 | Lewis | G06F 11/3089 714/43 |

* cited by examiner

*Primary Examiner* — Thomas J Dailey
(74) *Attorney, Agent, or Firm* — Jackson Walker L.L.P.

(57) ABSTRACT

In accordance with embodiments of the present disclosure, an information handling system may include a host system and a management controller communicatively coupled to the host system processor. The host system may include a host system processor and a device coupled to the host system processor. The management controller may be configured to provide management of the information handling system, provide a plurality of management interfaces, and provide a user interface for configuring a respective network interface affinity for each management interface to system management features supported by the management controller.

21 Claims, 2 Drawing Sheets

SYSTEMS AND METHODS FOR CONFIGURING NETWORK INTERFACE AFFINITY TO SYSTEM MANAGEMENT FEATURES SUPPORTED BY A MANAGEMENT CONTROLLER

TECHNICAL FIELD

The present disclosure relates in general to information handling systems, and more particularly to methods and systems for configuring network interface affinity to system management features supported by a management controller in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include a management controller, such as an Integrated Dell Remote Access Controller (iDRAC), to perform out-of-band remote management tasks on various components of the information handling system. As security of information handling systems becomes more and more important, the availability of two distinct high-speed interfaces into a management controller in which one interface is coupled to a local trusted network for provisioning and another interface is coupled to the Internet or an external network for monitoring and less intrusive operations may be desirable.

SUMMARY

In accordance with the teachings of the present disclosure, the disadvantages and problems associated with existing approaches for implementing management controllers may be reduced or eliminated.

In accordance with embodiments of the present disclosure, an information handling system may include a host system and a management controller communicatively coupled to the host system processor. The host system may include a host system processor and a device coupled to the host system processor. The management controller may be configured to provide management of the information handling system, provide a plurality of management interfaces, and provide a user interface for configuring a respective network interface affinity for each management interface to system management features supported by the management controller.

In accordance with these and other embodiments of the present disclosure, a method may include, in an information handling system comprising a host system having a host system processor and a device coupled to the host system processor: providing, by a management controller communicatively coupled to the host system processor, management of the information handling system; providing, by the management controller, a plurality of management interfaces; and providing, by the management controller, a user interface for configuring a respective network interface affinity for each management interface to system management features supported by the management controller.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, in an information handling system comprising a host system having a host system processor and a device coupled to the host system processor: provide, by a management controller communicatively coupled to the host system processor, management of the information handling system; provide, by the management controller, a plurality of management interfaces; and provide, by the management controller, a user interface for configuring a respective network interface affinity for each management interface to system management features supported by the management controller.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
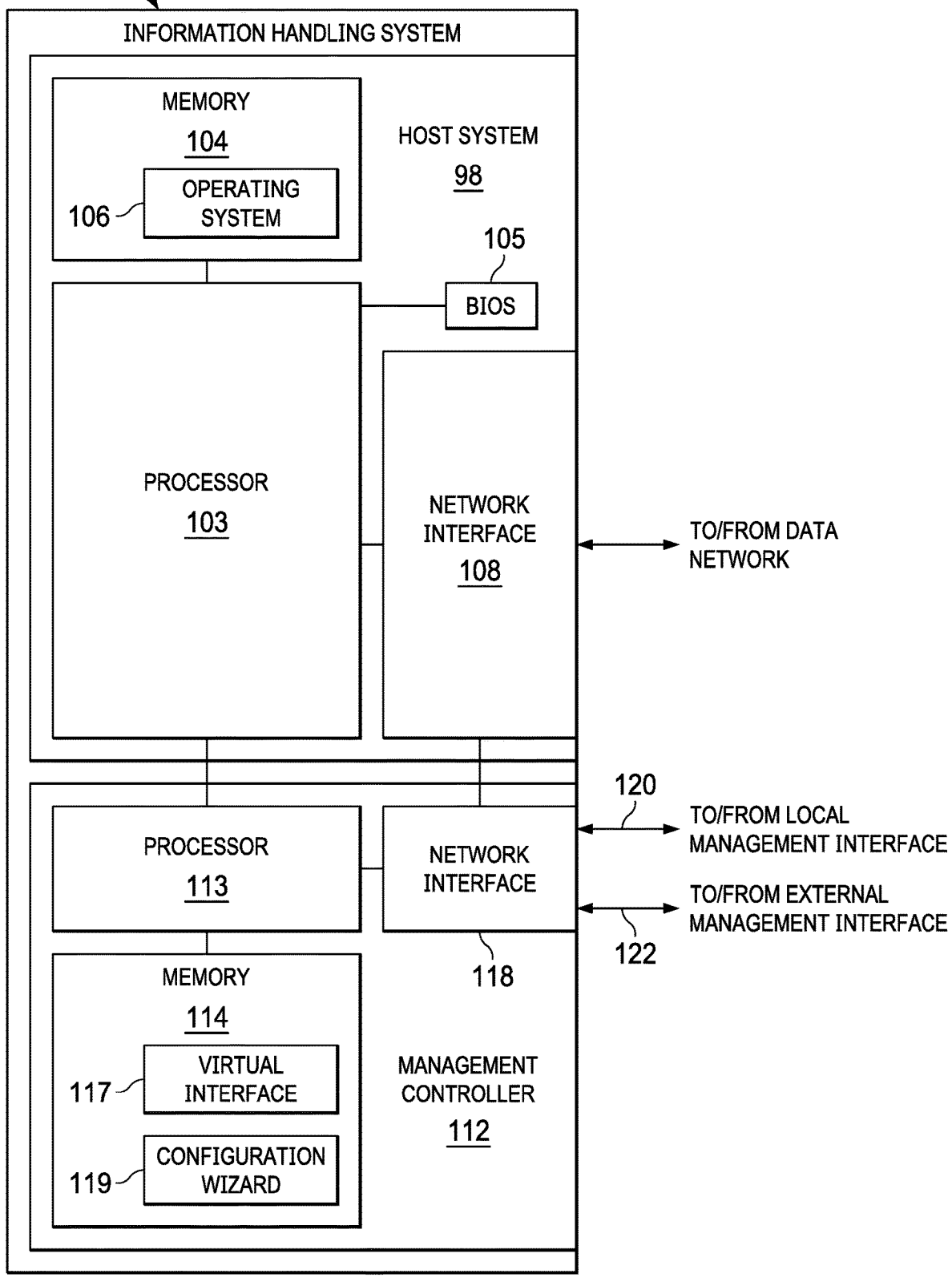
FIG. 1 illustrates a block diagram of an example information handling system, in accordance with embodiments of the present disclosure.
Figure 2:
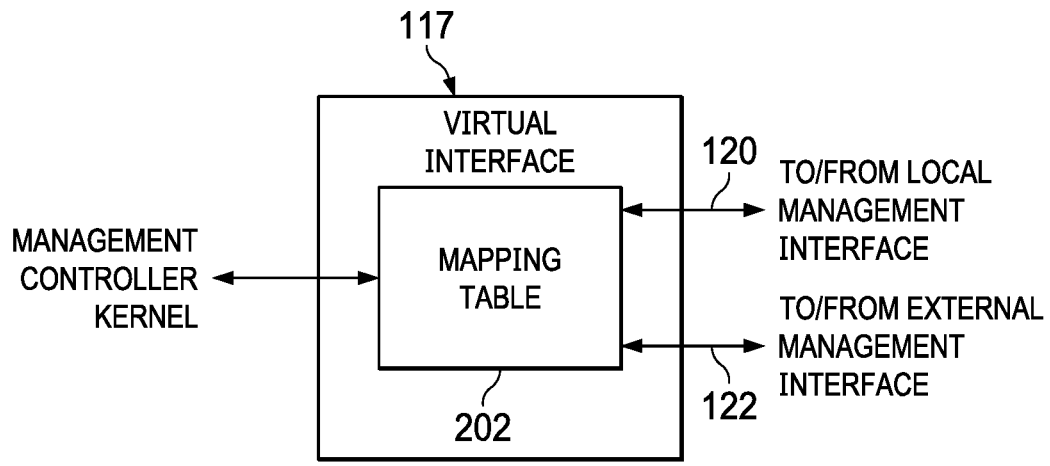
FIG. 2 illustrates a functional block diagram for a virtual interface, in accordance with embodiments of the present disclosure.
Figure 3:
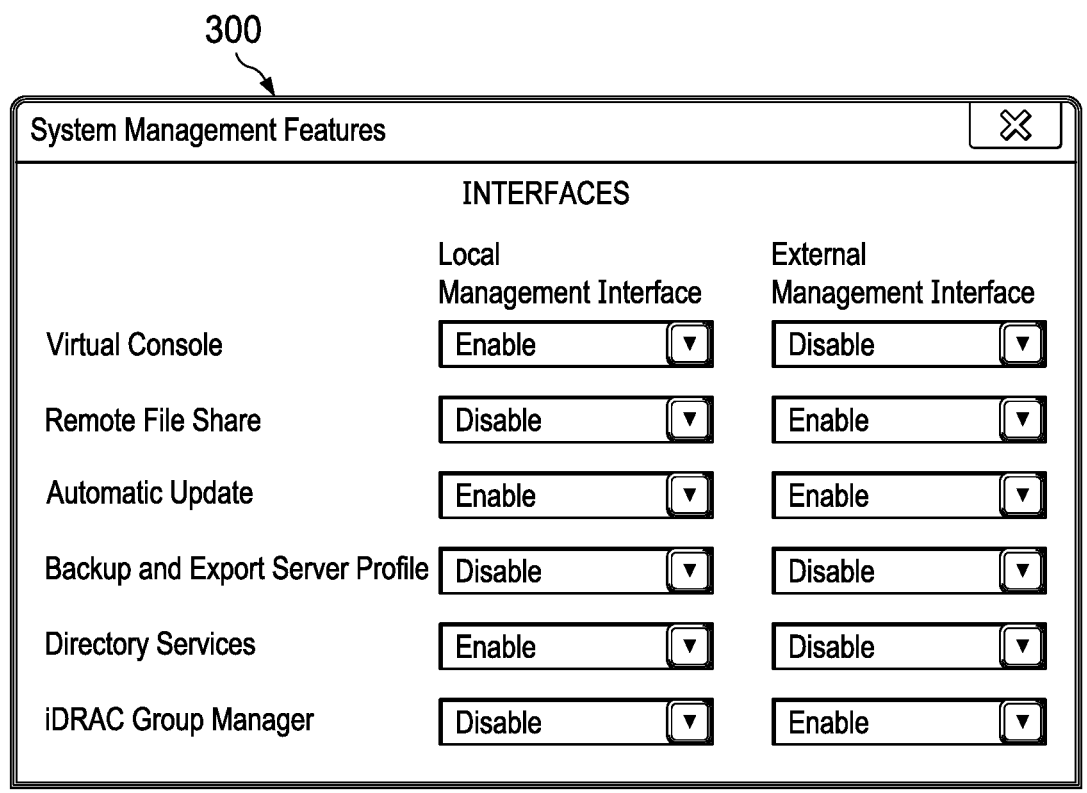
FIG. 3 illustrates a user interface screen that may be displayed to an administrator to facilitate configuring network interface affinity to system management features, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a network interface 108 communicatively coupled to processor 103, and a management controller 112 communicatively coupled to processor 103. In operation, processor 103, memory 104, BIOS 105, and network interface 108 may comprise at least a portion of a host system 98 of information handling system 102. For purposes of clarity and exposition, information handling system 102 has been depicted to comprise only a single host system 98. In some embodiments, information handling system 102 may comprise a plurality of host systems 98.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Network interface 108 may comprise any suitable system, apparatus, or device operable to serve as an interface between information handling system 102 and one or more other information handling systems via an in-band management network. Network interface 108 may enable information handling system 102 to communicate using any suitable transmission protocol and/or standard. In these and other embodiments, network interface 108 may comprise a network interface card, or "NIC." In some embodiments, network interface 108 may comprise a 10 gigabit Ethernet network interface. In these and other embodiments, network interface 108 may be enabled as a local area network (LAN)-on-motherboard (LOM) card. In these and other embodiments, processor 103 and network interface 108 may be coupled via any suitable interface, including without limitation a Peripheral Component Interconnect Express (PCIe) bus/interface.

Management controller 112 may be configured to provide management facilities for management of information handling system 102. Such management may be made by management controller 112 even if information handling system 102 is powered off or powered to a standby state. Management controller 112 may include a processor 113, memory 114, and a management network interface 118 separate from and physically isolated from data network interface 108. In certain embodiments, management controller 112 may include or may be an integral part of a baseboard management controller (BMC) or a remote access controller (e.g., a Dell Remote Access Controller or Integrated Dell Remote Access Controller).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112. As shown in FIG. 1, processor 113 may be communicatively coupled to processor 103. Such coupling may be via a Universal Serial Bus (USB), System Management Bus (SMBus), Peripheral Component Interconnect Express (PCIe) bus, and/or one or more other communications channels.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off.

As shown in FIG. 1, memory 114 may have stored thereon a virtual interface 117. Virtual interface 117 may comprise any program of executable instructions, or aggregation of programs of executable instructions, to provide hardware abstraction such that network interface 118 may be managed as if it were a plurality of physical network interfaces, as described in greater detail below.

As shown in FIG. 1, memory 114 may also have stored thereon a configuration wizard 119. Configuration wizard 119 may comprise any program of executable instructions, or aggregation of programs of executable instructions, configured to provide a user interface to allow an administrator to interact with the user interface to configure network interface affinity of a local management interface of network interface 118 accessed via a first channel 120 and network interface affinity of an external management interface accessed via a second channel 122 to management features supported by management controller 112. An example of such a user interface and configuration of network affinity to system management features is set forth below in greater detail with respect to FIG. 3 and the description thereof.

Network interface 118 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." In some embodiments, network interface 118 may comprise a 1 gigabit Ethernet network interface.

As shown in FIG. 1, network interface 118 may, based on configuration settings of virtual interface 117, couple to a local management interface via a first channel 120 and couple to an external management interface via a second channel 122. In some embodiments, local management interface may comprise a local network with higher access privileges to management controller 112 in order to perform provisioning and higher-level management operations, while external management interface may comprise the Internet or another external network with lower access privileges to management controller 112 to perform less-obtrusive operations, such as monitoring.

In addition to processor 103, memory 104, network interface 108, and management controller 112, information handling system 102 may include one or more other information handling resources.

In operation, management controller 112 may configure virtual interface 117 and network interface 118 such that management controller 112 provides multiple management interfaces, each management interface having configurable properties, and each management interface being capable of simultaneous usage. For example, management controller 112 may configure virtual interface 117 and network interface 118 such that management controller 112 interfaces with local management interface and external management interface, and configure each management interface with different properties (e.g., configure local management interface with higher access privileges and external management interface with lower access privileges). In addition or alternatively, as another example, one management interface may be configured for use as a shared network interface among host systems 98 (e.g., for monitoring by the external management interface) and another management interface may be configured for use as a dedicated network interface to management controller 112 (e.g., for provisioning by the local management interface).

Due to management controller 112 interfacing with two (or more) different management interfaces, applications and firmware operating within management controller 112 need to support such two interfaces. Accordingly, virtual interface 117 may operate as a virtual layer that executes on top of channels 120 and 122 and performs context-based mapping to operate as a single emulated network interface to applications and firmware operating within management controller 112 while still exposing multiple physical interfaces to the management interfaces, and virtual interface 117 may maintain an appropriate mapping table (e.g., an iptable) or other data structure based on which virtual interface 117 may permit or deny management commands requested via the management interfaces based on which management interface a command is received and whether the command originates from a source authorized for such management interface, and may route replies to the proper management interface based on content of replies.

To further illustrate, FIG. 2 illustrates a functional block diagram for virtual interface 117, in accordance with embodiments of the present disclosure. As shown in FIG. 2, virtual interface 117 may implement a mapping table 202 or other data structure that performs context-based mapping between a kernel of management controller 112 on the one hand, and local management interface and external management interface on the other hand.

FIG. 3 illustrates a user interface screen 300 that may be displayed to an administrator to facilitate configuring network interface affinity to system management features, in accordance with embodiments of the present disclosure. In operation, configuration wizard 119 may be configured to display such user interface screen 300 and receive user input entered by an administrator in connection with user interface screen 300 in order to configure network interface affinity to system management features.

As shown in FIG. 3, by interacting with user interface screen 300, an administrator of information handling system 102 may configure network interface affinity (e.g., local management interface and external management interface shown in FIG. 1) to system management features of management controller 112 by selectively enabling and disabling system management features for each interface. Based on such administrator configuration, configuration wizard 119 may create a map or listing of the features associated with each network interface and, either alone or in concert with virtual interface 117, enforce such mapping at run time. In some embodiments, configuration wizard 119 may, either alone or in concert with virtual interface 117, providing logging or messaging to an administrator or other user in the event of affinity errors.

In the foregoing, FIG. 3 shows configuration of management features to only two network interfaces, for the purposes of clarity and exposition. However, the configuration of network interface affinity to system management features may be performed for any suitable number and/or types of network interfaces, including without limitation those depicted herein as well as others such as Keyboard Controller Style (KCS) interfaces, Universal Serial Bus network interface card interfaces, etc.

Also in the foregoing, FIG. 3 shows a graphical user interface wizard to facilitate configuration of network interface affinity to system management features. However, the configuration of network interface affinity to system management features may be facilitates by any suitable user interface, including without limitation the graphical user interface depicted herein or any suitable command line interface.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
  a host system, wherein the host system includes a host system processor and a first physical network interface; and
  a management controller communicatively coupled to the host system processor, wherein the management controller includes:
    a management controller processor; and
    a second physical network interface communicatively coupled to the management controller processor;
  wherein the management controller processor is configured to perform management operations, wherein the management operations include:
    supporting a plurality of system management features for managing the information handling system;
    coupling, via the second physical network interface, to any one of two or more management interfaces, wherein the two or more management interfaces include a local management interface and an external management interface; and providing a system management user interface for configuring system management supported by the management controller, wherein the system management user interface enables a user to selectively enable or disable each of the two or more management interfaces with respect to each of the plurality of system management features, wherein each system management feature may be enabled for any one or more of the two or more system management interfaces.

2. The information handling system of claim 1, wherein the management controller is further configured to execute a virtual interface that abstracts the plurality of management interfaces to applications of the management controller.

3. The information handling system of claim 2, wherein the management controller is further configured to perform context-based mapping between the management interfaces and a kernel of the management controller.

4. The information handling system of claim 3, wherein the context-based mapping maps each management command received from the plurality of management interfaces based on the management interface from which the command is received.

5. The information handling system of claim 3, wherein the context-based mapping maps each reply to a management command received from the plurality of management interfaces to the management interface from which the command is received.

6. The information handling system of claim 1, wherein the management controller is further configured to:
create a map of system management features associated with each management interface; and
enforce such mapping at run time of the information handling system.

7. The information handling system of claim 6, wherein the management controller is further configured to perform at least one of logging or messaging in response to an error in a configuration of the system management features.

8. A method for managing an information handling system including a host system having a host system processor and a first physical network, wherein the method comprises:
performing, by a management controller communicatively coupled to the host system, management operations, wherein the management controller includes a management controller processor and a second physical network interface communicatively coupled to the management controller processor, and wherein the management operations include;
supporting a plurality of system management features for managing the information handling system;
coupling, via the second physical network interface, to any one of two or more management interfaces, wherein the two or more management interfaces include a local management interface and an external management interface; and
providing a system management user interface for configuring system management features supported by the management controller, wherein the system management user interface enables a user to selectively enable or disable each of the two or more management interfaces with respect to each of the plurality of system management features, wherein each system management feature may be enabled for any one or more of the two or more system management interfaces.

9. The method of claim 8, further comprising executing, by the management controller, a virtual interface that abstracts the plurality of management interfaces to applications of the management controller.

10. The method of claim 9, further comprising performing, by the management controller, context-based mapping between the management interfaces and a kernel of the management controller.

11. The method of claim 10, wherein the context-based mapping maps each management command received from the plurality of management interfaces based on the management interface from which the command is received.

12. The method of claim 10, wherein the context-based mapping maps each reply to a management command received from the plurality of management interfaces to the management interface from which the command is received.

13. The method of claim 8, further comprising:
creating, by the management controller, a map of system management features associated with each management interface; and
enforcing, by the management controller, such mapping at run time of the information handling system.

14. The method of claim 13, further comprising performing, by the management controller, at least one of logging or messaging in response to an error in a configuration of the system management features.

15. An article of manufacture comprising:
a non-transitory computer-readable medium; and
computer-executable instructions carried, on the computer-readable medium, wherein the instructions, when read and executed by a processor, cause the processor to perform operations for managing an information handling system including a host system having a host system processor and a first physical network interface, wherein the operations include:
performing, by a management controller communicatively coupled to the host system, management operations, wherein the management controller includes a management controller processor and a second physical network interface communicatively coupled to the management controller processor, and wherein the management operations include;
supporting a plurality of system management features for managing the information handling system;
coupling, via the second physical network interface, to any one of two or more management interfaces, wherein the two or more management interfaces include a local management interface and an external management interface; and
providing a system management user interface for configuring system management features supported by the management controller, wherein the system management user interface enables a user to selectively enable or disable each of the two or more management interfaces with respect to each of the plurality of system management features, wherein each system management feature may be enabled for any one or more of the two or more system management interfaces.

16. The article of claim 15, the instructions for further causing the processor to execute, by the management controller, a virtual interface that abstracts the plurality of management interfaces to applications of the management controller.

17. The article of claim 16, the instructions for further causing the processor to perform, by the management controller, context-based mapping between the management interfaces and a kernel of the management controller.

18. The article of claim 17, wherein the context-based mapping maps each management command received from the plurality of management interfaces based on the management interface from which the command is received.

19. The article of claim 17, wherein the context-based mapping maps each reply to a management command received from the plurality of management interfaces to the management interface from which the command is received.

20. The article of claim 15, the instructions for further causing the processor to:
- create, by the management controller, a map of system management features associated with each management interface; and
- enforce, by the management controller, such mapping at run time of the information handling system.

21. The article of claim 20, the instructions for further causing the processor to perform, by the management controller, at least one of logging or messaging in response to an error in a configuration of the system management features.

\* \* \* \* \*

UNITED STATES PATENT AND TRADEMARK OFFICE
CERTIFICATE OF CORRECTION

| | |
|---|---|
| PATENT NO. | : 11,005,726 B2 |
| APPLICATION NO. | : 16/036154 |
| DATED | : May 11, 2021 |
| INVENTOR(S) | : Mugunda et al. |

It is certified that error appears in the above-identified patent and that said Letters Patent is hereby corrected as shown below:

In the Claims

In Column 9, Line 5, Claim 1, delete "management supported," and insert -- management features supported --, therefor.

Signed and Sealed this
Ninth Day of January, 2024

Katherine Kelly Vidal
*Director of the United States Patent and Trademark Office*